United States Patent [19]
Clayton et al.

[11] Patent Number: 5,793,637
[45] Date of Patent: Aug. 11, 1998

[54] METHOD AND APPARATUS FOR BANDING COPPER CATHODES

[75] Inventors: Joseph T. Clayton; Michael J. Lemmer; Kenneth L. Day; Ethel M. Harris; Karl H. Berge; James N. White; James T. Goolsby; Raphel C. Craven, Sr.; Walter H. Fewell, all of Amarillo, Tex.

[73] Assignee: Asarco Incorporated, New York, N.Y.

[21] Appl. No.: 610,385

[22] Filed: Mar. 4, 1996

[51] Int. Cl.⁶ .................................................. B65G 1/00
[52] U.S. Cl. ........................... 364/478.01; 364/478.03; 414/785.2; 53/529
[58] Field of Search ................. 364/478.01–478.18; 204/106; 414/790.4, 790.5, 789.2, 766; 53/528, 529

[56] References Cited

U.S. PATENT DOCUMENTS 4,188,462  2/1980  Klootwyk ........................... 429/68
4,536,118  8/1985  Baba .
4,555,942  12/1985  Ludvigsson .
5,474,168  12/1995  Leslie et al. ....................... 198/484.1
5,564,890  10/1996  Knudsen, Jr. ...................... 414/786

OTHER PUBLICATIONS

ORGAPACK, Steel Strapping, Strapping Installations, by Orgapack, Inc. Torrington, CT 06790 No Date.

Primary Examiner—James P. Trammell
Assistant Examiner—Kaminis S. Shah
Attorney, Agent, or Firm—DeLio & Peterson, LLC; John J. Tomaszewski; Kenneth A. Koch

[57] ABSTRACT

A method is provided for banding copper cathodes which is efficient and cost effective using a system comprising stacking the cathodes, moving the stacked cathodes on a conveyor belt, weighing the stack, identifying the stack by a bar code or other identification means, pressing the stack to align the cathodes, banding the stack and then removing the banded stack from the system. A control system is also provided whereby predetermined stack and method parameters are compared with stack data obtained by weighing the cathode stack and/or reading a bar code or other identifying indicia associated with the stack to control the system and operate the method.

13 Claims, 2 Drawing Sheets

METHOD AND APPARATUS FOR BANDING COPPER CATHODES

BACKGROUND OF THE INVENTION

1. Field of the Invention

This invention relates to a product packaging and handling system and, in particular, to an automated system for efficiently and effectively banding stacks of copper cathodes made in an electrorefining or electrowinning operation for storage and/or delivery.

2. Description of Related Art

Packaging is an essential element in all areas of business since the products to be sold must be packaged for shipment, storage, use and/or sale. Consumer products are generally boxed and the box labeled with the information needed to describe the product. Industrial products are generally sold in the form the industrial product is made. Liquids and flowable solids such as grain are generally sold in tank cars, cartons or drums and usually present little or no packaging problems due to nature of the material. Industrial products in solid form however, such as bars, slabs, billets, sheet and the like cannot be as conveniently packaged as liquids and are usually assembled into a selling quantity, secured together by banding with metal or plastic straps and shipped or stored.

Depending on the solid product form, the above assembling, banding and storage procedure can be labor intensive, costly and inefficient. For convenience, the following description will be directed to copper cathode products which is a major industrial product but it will be appreciated by those skilled in the art that the product handling system of the invention may be used for other solid products requiring banding to make a product unit suitable for use or sale.

Copper cathodes are made by electrowinning and electrorefining processes and are generally in the form of a thin rectangular product about 39½ inch wide×41 inch high×1¼ inch thick and are usually about 350 pounds. Typically, a number of cathodes usually 21, are placed on top of each other and assembled into horizontal stacks and delivered to a site where workers band the stacked cathodes together. The banded cathodes are given identification codes such as a customer code, weight code, etc. and then transferred to storage or shipped to a customer. This procedure is repetitious, dangerous, slow and inefficient from both a manpower and cost standpoint. Additionally, such a manual banding and identification operation may result in banded cathodes which do not meet quality standards, have incorrect shipment and/or storage data associated with the particular stack and be improperly banded depending on customer requirements.

Bearing in mind the problems and deficiencies of the prior art, it is therefore an object of the present invention to provide a product packaging and handling system for banding products.

It is a further object of the present invention to provide a product packaging and handling system for banding solid products such as stacks of copper cathodes.

It is another object of the present invention to provide a cost effective and efficient method for banding copper cathodes.

Still other objects and advantages of the invention will in part be obvious and will in part be apparent from the specification.

SUMMARY OF THE INVENTION

The above and other objects and advantages, which will be apparent to those skilled in the art, are achieved in the present invention which is directed to, in a first aspect, a method for banding copper cathode stacks comprising: providing a cathode stack packaging and handling system comprising stack loading means; stack moving means; stack data determining means such as stack identification means and stack weighing means; optionally stack rotating means; stack pressing means; stack banding means; stack removal means; and control means for storing and comparing predetermined cathode stack and method parameters and stack determined data to control the method; loading a cathode stack into the system and determining the cathode stack data; transmitting the stack data to the control means; comparing the stack data with the predetermined parameters by the control means to determine if the cathode stack is acceptable and should continue to be processed or if the cathode stack is unacceptable and should be adjusted to correct the defect or removed from the system as an unacceptable cathode stock product; if the process continues for the stack, pressing the cathode stack in at least one direction and preferably two directions to align the cathodes in the stack; positioning the pressed cathode stack for banding; banding the positioned cathode stack; removing the banded cathode stack from the system; and continuing the method until all the cathode stacks desired to be banded are banded.

In another aspect of the invention a cathode stack banding system is provided comprising: cathode stack loading means; cathode stack moving means; cathode stack data determining means such as cathode stack weighing means and cathode stack identification means; cathode stack pressing means; optional means for turning the cathode stack on the stack moving means; cathode stack positioning means; cathode stack banding means; means for removing the cathode stack from the system; and system control means.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
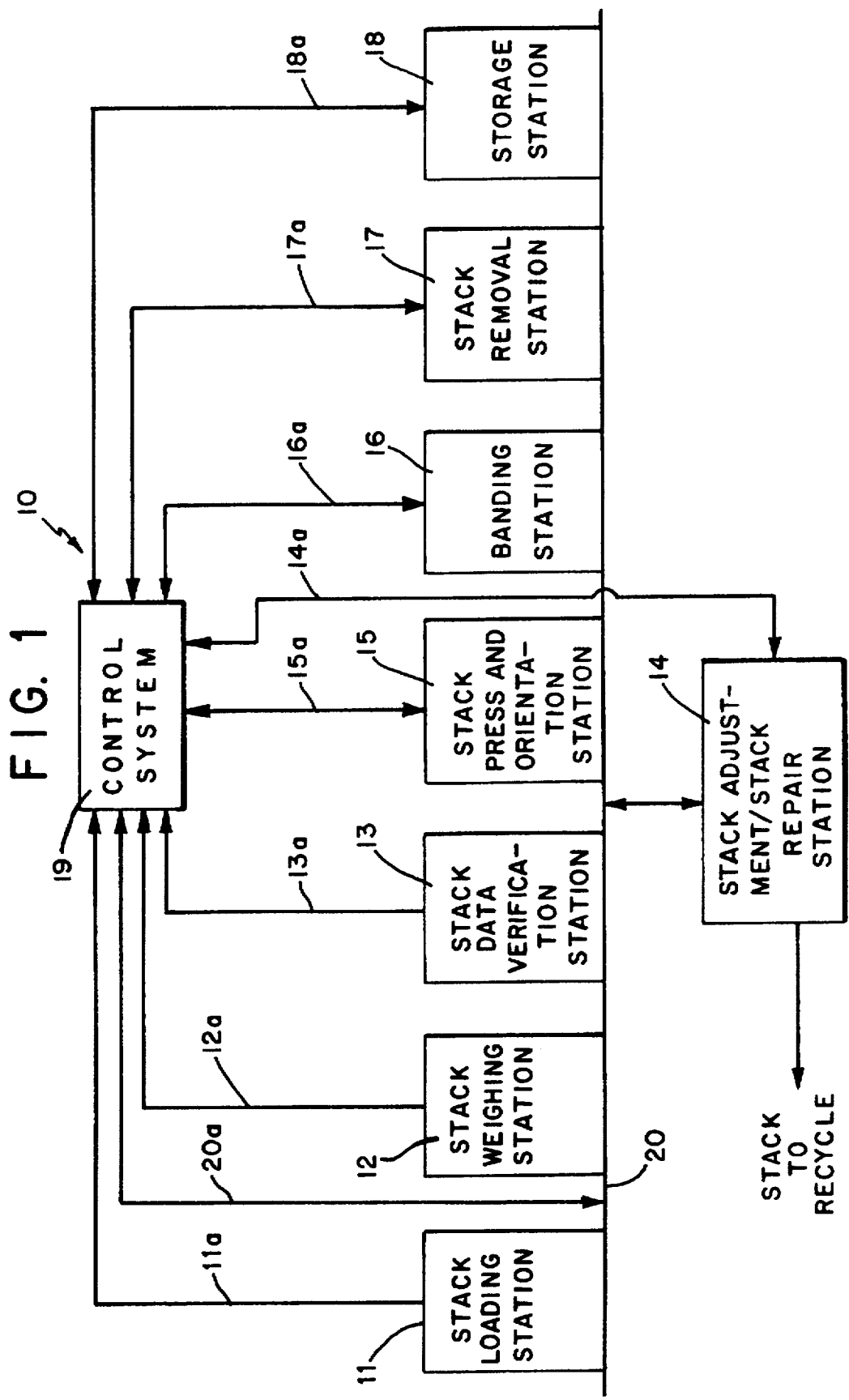
FIG. 1 is a schematic diagram of a product packaging and handling system of the invention used to band copper cathode stacks.

In describing the preferred embodiment of the present invention, reference will be made herein to FIGS. 1–2 of the drawings in which like numerals refer to like features of the invention. Features of the invention are not necessarily shown to scale in the drawings.

Figure 2:
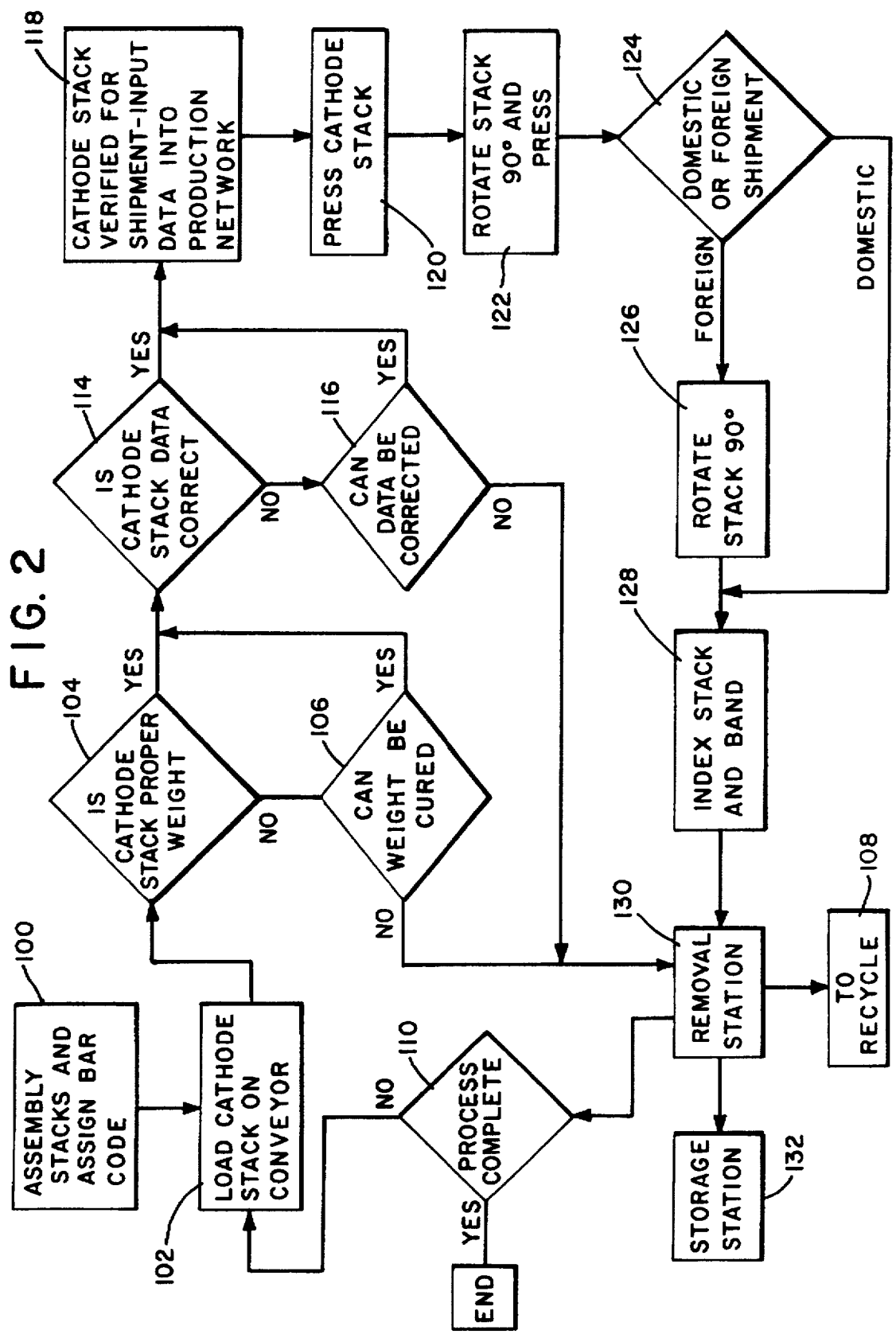
FIG. 2 is a flow chart of a method of the invention.

Referring to FIG. 1, the automatic product packaging and handling system 10 of the present invention comprises a stack input or loading station 11, a stack weighing station 12, a stack data verification station 13, a stack removal or stack adjustment station 14, a stack orientation and press station 15, a stack banding station 16, a stack removal station 17, a stack storage station 18, a control system unit 19 and a cathode stack moving means 20. Data communication for both product data and process data to control the stations is provided by lines 11a–18a and 20a.

Stations 11–17 are preferably associated with a conveyor system 20 on which the cathode stacks are placed and positioned at stack loading station 11. Data relating to the cathode stack may be transmitted via line 11a to control system 19. The stack is then moved through the system until the stack removal station 17 is reached at which point the banded stacks are removed by a forklift truck or other device for storage at storage station 18. As discussed hereinbelow, the cathode stack may be removed from the system at station 14.

The conveyor 20 is typically a conventional conveyor chain and sprocket mechanism using adjustable speed gearbox drives to stop the conveyor and/or control the speed of the conveyor. In a preferred embodiment, the conveyor 20 comprises a plurality, e.g., three separate independently operated and controlled conveyors. Thus, an entrance conveyor is used to hold the cathode stacks sequentially in a series and is of a length sufficient to hold about four cathode stacks.

The next conveyor has the weight station 12, data verification station 13, stack adjustment and stack repair station 14 and stack press and orientation station 15. The weigh station 12 comprises any conventional scale such as a Base scale. The stack data verification station 13 is preferably a conventional bar code reader. In general, the bar code reader scan beam scans the bar code of the stack as it moves on the conveyor past the reader. The bar code should preferably be parallel to the scanner and typically beeps when the bar code has been successfully decoded. If the bar code cannot be read, the control system senses an error and corrective action must be taken. Each copper stack entering the system typically contains a bar code or similar identifying means which can be automatically read by the bar code reader and/or entered into the control system 19, which code identifies the copper stack and typically its destination, origin and weight information. The orientation and press station 15 preferably comprises hydraulic cylinders and associated platens generally rectangular in shape and sized to contact the length and height of the horizontally positioned cathode stack and positioned to straighten each of the cathodes in the cathode stack and align the cathodes in a particular direction. The station 15 also preferably comprises a bearings turntable mechanism in conjunction with the conveyor to turn and orient the stack 90° from the original loaded position for straightening in this position. It is preferred to press the stack in both the longitudinal and transverse axes to align the cathode stack into a substantially rectangular configuration.

The next conveyor is employed with the banding station 16 and stack removal station 17. The banding station 16 comprises a conventional banding machine and the banding mechanism may be positioned in any convenient configuration. The banding head is preferably in a vertical position, top mounted and has a floating strapping head. The banding station 16 is conventional and comprises a frame, a movement mechanism such as rodless electric (actuator) cylinders for providing linear motion to the stack to position the cathode stack and the banding head. Each cylinder preferably uses a keypad-programmed indexer and drive amplifier for interface with the control system 19. A rodless unit comprises a moving carriage supported by linear bearings within an extruded aluminum chassis. This gives the rodless actuator the ability to guide and support a load. The moving carriage is driven by a lead screw. Banded cathodes are moved from the banding station 16 to the stack removal station 17 where the finished banded and data verified cathode stack is ready for removal by a forklift or other transport mechanism and transferred to storage area 18.

Control system 19 comprises a typical computer or other programmable logic circuitry such as an Allen Bradley 500 Series PLC Controller and preferably includes data storage which implements many of the functions of the product handling process and system of the present invention which is described in detail below. It is preferred that the control system be interfaced with the plant's production network which contains data for all phases of the cathode stack process from making of the copper cathode to its storage and delivery. The control system 19 may also be interfaced with a processor to automatically place each stack in a particular shipping lot. Once each stack is lotted, an ink-jet printer labels the stack and the lot automatically built into the production network.

Referring to FIG. 1 operation of the cathode banding system of the present invention may be described. A forklift or other carrier such as a straddle carrier deposits a copper cathode stack (containing a bar code) on the entrance conveyor at stack loading station 11 and the presence of the stack entered into control system 19 via line 11a. If a straddle carrier is used, multiple stacks may be placed at one time at stack load station 11. It will be understood in this embodiment of the invention that each cathode stack moves individually on the conveyor belt through the system to the stack removal station 17. In other words, the stacks are placed on the conveyor and move sequentially and are processed sequentially through the system. Multiple conveyor lines can be used for other cathode stacks with each line being controlled by the same control system.

As noted above, each conveyor line may use multiple sequential and independently controlled conveyors to enable more efficient processing. For example, typically one cathode stack is moved at a time through the system from stack loading station 11 to stack removal station 17. Using multiple conveyors in series, a cathode stack may be weighed at station 12 simultaneously while another stack is being banded at banding station 16. It will be appreciated that each of the operations preformed on the stack, e.g., weighing, pressing, etc., take different processing times and the use of multiple conveyors in series enables a more efficient travel of the cathode stack through the system.

After the stack or stacks are loaded at station 11, each stack is weighed at stack weighing station 12 and the weight information transmitted to control system 19 via line 12a. The weighed stack is then conveyed to stack data verification station 13 where its bar code label is scanned for product and customer information and verification with the predetermined parameters stored in the control system 19. The bar code label information is transmitted to control system 19 via line 13a.

In the event that the cathode stack has an improper weight, the bar code data are not verified or other error determined by the control system or even manually, the stack can be removed at station 14. If the defect in the stack can be cured the defect is cured and the stack continues in the system on the conveyor 20. The conveyor 20 would typically be stopped when an error is detected. Preferably, if the defect cannot be cured, the defective stack is either manually or automatically continued through the system until stack removal station 17 is reached and then removed for recycle. The stack may or may not be pressed and/or banded depending on the defect and recycle requirements.

The weighed and data verified cathode stack is now hydraulically straightened at orientation and press station 15 as controlled by control system 19 via line 15a. It is preferred that the pressed stack be rotated 90° from its original orientation and straightened again to ensure that the stack is aligned in both its longitudinal and transverse directions. As will be further described hereinbelow, for domestic shipments, the stack is then rotated 90° back to its original orientation for positioning in banding station 16. For export shipments, the stack is transported in the 90° rotated position to the banding station 16. In the banding station 16, the stack is indexed under the banding machine and the banding machine secures straps around the stack. It is preferred to apply three steel straps around each stack. The banded stack is then moved to the stack removal station 17 where it is removed by a forklift truck or straddle carrier and transported to storage area 18.

The product handling system of the present invention will now be described in detail with reference to FIG. 2. The process starts at step 100 where cathode stacks are assembled and a bar code attached to the stack. In step 102, stack load station 11 receives individual cathode stacks on the conveyor. The cathode stacks preferably have a bar code thereon identifying the customer, shipping destination, etc., before loading at step 102. In step 104 the cathode stack weight is measured and compared with predetermined parameters. If the stack weight is determined to be improper, step 106 determines if the weight defect can be remedied. If the weight can be remedied, the weight is so remedied and the process is continued at step 114. If the weight can not be remedied the stack is passed through the system without being processed to removal station 130 and removed at step 108 and recycled. Step 110 determines whether the process is complete or if other cathode stacks need to be processed and banded. If the process is determined to be complete the process is ended at step 112. If it is determined that the process is not complete, the process is continued at step 102.

If the cathode stack weight is determined to be proper in step 104 or if the stack weight defect is remedied, the process is continued in step 114 which reads the bar code of the cathode stack. If the bar code information is not verified, step 116 determines if the defect can be remedied. As above, if the defect can not be remedied, the stack is passed through the system without being processed to removal station 130 and removed at step 108 for recycle. If the defect can be remedied, the defect is remedied and the process is continued in step 118. In step 118 the stack is now verified for shipment and the shipment information is put in the production network of the control system 19. In step 120 the stack is pressed to align the individual cathodes in the stack along a particular axis usually the longitudinal axis which is the preferred direction to position the stacks at loading. In step 122, the pressed stack is rotated 90° from its original loaded orientation and pressed again to align the stack on all four sides.

In step 124 the shipment location is checked to determine if the stack is for domestic shipment or export shipment. If the stack is for export shipment, the stack is rotated back 90° in step 126. If the stack is for domestic shipment, the stack is moved along in its last position which is 90° from its original loaded orientation. In step 128 the stack is indexed and banded. In step 130 the stack is removed from the system for storage in step 132.

After removal, in step 110 it is determined if the process is complete. If the process is complete it goes to step 112 which ends the process. If the process is not complete and other stacks need to be processed, the process returns to step 102.

The product handling system of the present invention may be used for handling any product which may be packed by banding or other comparable or similar packaging method. For example, the process can be used with bars, sheet rods, etc. and it will be appreciated by those skilled in the art, that this system can also be employed for banding boxed products. It will also be appreciated by those skilled in the art that other stack data can be measured and used by the control system to control the system.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for banding copper cathode stacks comprising:

providing a cathode handling system comprising stack loading means, stack moving means, stack data determining means, optionally stack rotating means, stack pressing means, stack banding means, stack removal means; and control means for storing and comparing predetermined cathode stack and method parameters and stack determined data to control the method;

loading a cathode stack into the system;

determining the cathode stack input data;

transmitting the stack data to the control means;

comparing the stack data with the predetermined cathode stack and method parameters by the control means to determine if the cathode stack should continue to be processed or if the cathode stack should be adjusted or removed from the system;

if the process continues for the stack, pressing the cathode stack to align the cathodes in the stack;

positioning the pressed cathode stack for banding;

banding the positioned cathode stack;

removing the banded cathode stack from the system; and continuing the method for all the cathode stacks desired to be banded.

2. The method of claim 1 wherein after the cathode stack is pressed, the pressed stack is rotated 90° and pressed again.

3. The method of claim 1 wherein the positioning of the pressed stack for banding is determined by the shipping location of the cathode stack.

4. The method of claim 1 wherein the control means is a computer.

5. The method of claim 4 wherein the stack data are the weight of the stack and identification of the stack and the method is stopped if the weight of the stack and/or the identification information of the stack does not meet the control system parameters and the stack is either removed from the system or passed through the system with or without being banded if the weight or identification information is not corrected.

6. The method of claim 1 wherein the stack moving means is a plurality of sequentially independently controlled conveyors.

7. A cathode stack banding system comprising:

cathode stack loading means;

cathode stack moving means;

cathode stack data determining means;

cathode stack pressing means;

cathode stack positioning means;

cathode stack banding means;

means for removing the cathode stack from the system; and system control means.

8. The cathode stack banding system of claim 7 further including means for turning the cathode stack on the moving means.

9. The cathode stack banding system of claim 7 wherein the moving means is a conveyor.

10. The cathode stack banding system of claim 7 wherein the moving means is a plurality of independently controlled conveyors.

11. The cathode stack banding system of claim 9 wherein the cathode stack data determining means includes a bar code reader.

12. The cathode stack banding system of claim 11 wherein the cathode stack data determining means includes a scale to weigh the cathode stack.

13. The cathode stack banding system of claim 12 wherein the banding means is a moving head bander.

* * * * *